Feb. 25, 1969 F. J. ROCHE 3,429,014

CLAMP ASSEMBLY FOR CONFRONTING ANNULAR FLANGES

Filed Dec. 4, 1967

FRANCIS J. ROCHE
INVENTOR
WHANN & McMANIGAL
BY Attorneys for Applicant

United States Patent Office 3,429,014
Patented Feb. 25, 1969

3,429,014
CLAMP ASSEMBLY FOR CONFRONTING ANNULAR FLANGES
Francis J. Roche, Pomona, Calif., assignor to Castle Industries Inc. of California, Montclair, Calif., a corporation of California
Filed Dec. 4, 1967, Ser. No. 687,539
U.S. Cl. 24—279　　　　　　　　　　　　　3 Claims
Int. Cl. F16l 33/04

ABSTRACT OF THE DISCLOSURE

A clamping device for confronting annular flanges, which includes flexible flange encircling means composed of segments of link-like construction having end openings for receiving cables therethrough, the end opening in each case having an inner wall with a camming face for engaging one of the confronting flanges, this inner wall being bridged by a reinforcing end wall which holds the inner wall against deformation under camming forces thereon as the cables are tightened around the flanges by means of a double ended bolt having threaded engagement with head members connected to the opposite ends of the cables and positioned in adjacent relation, when the clamping device is applied to the flanges.

Background of the invention

The present invention relates to clamping devices.

Clamping devices as presently constructed and as now widely used in the industry, and particularly in the aircraft industry for the connection or coupling of the flanged ends of ducting and the like, have in the main been constructed with elongate arcuate flange engaging shoes or sections which were stamped or otherwise formed from a single layer of sheet metal to provide a central ridge defining groove with camming side walls adapted to engage the abutting flanges of the ducting ends. These shoes, in conventional structures, were spot welded or otherwise fixedly secured to an outer encircling flexible band having its adjacently positioned ends secured to a tightening device by which the band could be tensioned so as to secure the device in operative position and apply clamping pressure on the clamping side walls against the confronting flanges.

In the conventional clamping device of the above construction, the shoes undesirably tended to be deformed adjacent the camming walls as camming forces were applied. As a result of this tendency, the conventional clamping devices were not entirely satisfactory for the reason that the connection was weak, subject to leakage, and otherwise unreliable.

Moreover, the general practice was to construct the above noted type clamp with a small number of shoes, which would, for example, in the case of three shoes provide an angular circumferential coverage in the order of 120° for each shoe. A clamp of this type was not flexible, and had to be constructed in a variety of specific sizes to fit the different sizes of ducting, since the longitudinal curvature of the shoes in each clamp had to conform to the curvature of the flange with which it was associated. Thus, a clamping device made for one size ducting could not be used efficaciously on a different size ducting.

The foregoing inherent disadvantages and objections to the conventional type clamping device has been overcome by the unique structure embodied in the present invention, as will more fully be set out and explained in the application.

Summary of the invention

The present invention relates generally to a clamping device, and is more particularly concerned with a clamping device of the character utilized for interconnecting adjacently disposed confronting flanges at the ends of ducting, and the like.

The invention finds particular use in the aircraft industry for connecting air ducts and other ducting, where it is desired to provide a light, strong sealed connection between the ends of the ducting sections.

Having in mind the inherent disadvantages of the prior art structures, it is one object of the present invention to provide an improved flexible clamp type coupling device for ducting and the like, which will provide a more reliable and stronger connection than in present conventional devices, which will reduce the probability of failures to a minimum, and yet which can be economically produced and conveniently stored in relatively small space until required for use.

Another object is to provide a flexible clamp device of the herein described character in which a pair of cables extend through the ends of a plurality of narrow clamping segments which can independently seat and accommodate to associated connected flanges, and which will provide a multiplicity of camming pressure points around the flanges.

Still another object is to provide a clamping device of the foregoing character, wherein the individual segments are constructed of a material of uniform thickness in a manner to provide camming surfaces at the ends of the segments, and which embodies a unique reinforcing for preventing distortion and deflection of the material at the camming surfaces under camming forces.

The above noted objects will be accomplished, and the inherent disadvantages in the conventional clamping devices as described above, as well as those of other constructions have been overcome in the present invention by providing spaced clamping cables which extend through openings at the ends of relatively narrow link-like segments, which permit a plurality of the links to be strung on the pair of spaced flexible clamping cables in such a manner that the links engage the associated flanges at a multiplicity of circumferential points and can independently accommodate to the flanges. The cables are arranged so that they act directly adjacent the flanges to force camming wall surfaces against the flanges. Distortion and deflection of the walls having the camming surfaces thereon is prevented by a unique bridging end wall structure at each end of the segment link.

Further objects and advantages of the invention will be brought out in the following part of the specification, wherein detailed description is for the purpose of fully disclosing several embodiments of the invention without placing limitations thereon.

Brief description of the drawings

Referring to the accompanying drawings, which are for illustrative purposes only:

FIG. 1 is a fragmentary elevational view of a fragmentary section of a clamping device according to the present invention;

FIG. 2 is an enlarged fragmentary view in elevation having a section portion to show the details of connecting the tensioning means with the flexible encircling clamping band structure of the device;

FIG. 3 is a transverse section at the tightening device, taken substantially on line 3—3 of FIG. 1;

FIG. 4 is a transverse sectional view, taken substantially on line 4—4 of FIG. 1, showing the operative relationship between the camming faces of the link segments and the connected flanges; and FIG. 5 is a fragmentary view showing a modified link segment structure.

Description of the preferred embodiments

Referring more specifically to the drawings, for illustrative purposes, the invention is shown as comprising generally a ring type clamping device as generally indicated at 10, and which is adapted to extend around and clampingly engage confronting end flanges 11 and 12 at the ends of ducting sections, as shown in FIG. 3. These flanges each have a radially planar face 13 on its end edge, and a circumferentially extending outwardly converging bevelled surface 14 on its inner edge.

The clamping device comprises a flexible structure arranged to extend around the confronting flanges of the duct sections which are to be coupled or interconnected, and includes a plurality of link-like segments 15 which are carried by a pair of spaced flexible cables 16 and 17, these cables having their ends secured to adjacently disposed head members 18 and 19 of a tensioning device 20 containing an actuator bolt 21 which is operable to move the head members towards and away from each other to tighten or loosen the clamping device.

The head members 18 and 19 are of similar construction, except that they embody right and left hand configurations. As exemplary of the construction of the head members, the head member 18 is shown in FIG. 2 as comprising a block body member 22 having a threaded transverse bore 23 for receiving one of the threaded ends, as indicated at 24, of the bolt 21.

As shown in FIGS. 2 and 3, the lower portion of the body 22 is centrally provided with a transverse channel 25 for receiving the confronting flanges 11 and 12 therein, the channel having outwardly diverging bevelled side walls 26 and 27 arranged for camming relation with the beveled surfaces 14—14 of the flanges so as to apply forces to pull the flanges together when the clamping device is applied. On opposite sides of the lower portion of the body 22, there is provided a transversely extending bore or passage 28 for receiving in each case the end portion of one of the cables 16 or 17. These cables are anchored by being provided with an end fitting 29 having an annular spherical seating surface 30 adapted to bear against an annular bevelled seating surface 31 at the adjacent end of the passage 28.

It will be seen that the segments are of a relatively narrow link-like construction, and it will be appreciated that the configuration of the segment may be modified without departing from the basic principles of construction as disclosed herein. As shown in FIG. 4, each segment is constructed of a plate-like material of substantially uniform thickness, and for such purpose, the segment may be fabricated from a flat sheet to provide the desired configuration, or by other means such as utilizing a seamless tube which is deformed by appropriate means to provide the desired configuration. More specifically, as shown in FIG. 4, one segment structure comprises a pair of side walls 32 and 33 which extend between the segment ends. The side wall 32 is of generally flat formation, while the side wall 33 is deformed to provide a central section 33a which is in surface engagement with the adjacent surface of side wall 32, and may be fixedly secured thereto by welding or other appropriate means. The side wall 33 also includes sections 33b and 33c which extend outwardly in diverging relation from the opposite ends of the central section 33a to provide inner walls having confronting camming faces 34—34 respectively which are adapted to engage the adjacent bevelled surface 14 of the associated flange as at a contact point 35 so that as the segment is drawn inwardly by tensioning of the cables 16 and 17, camming forces will be exerted against the confronting flanges to force them into pressure engagement of their surfaces 13—13.

In order to reinforce the end portions of the segment and oppose deformation of the sections 33b and 33c under the action of camming forces, the sections 33b and 33c are bridged by an end wall 36 which interconnects the outer end of the section 33b or 33c with the adjacent end of side wall 32. As thus arranged, the end wall 36 cooperates with the section 33b at one end of the segment to form a transverse opening or passage 37 for the cable 16, and at the other end of the segment the end wall 36 cooperates with the section 33c to provide a similar passage 38 for the cable 17. The segments are thus freely attached to the cables for independent movement so that the individual segments may readily accommodate to the associated circumferential portions of the flanges 11 and 12 at a multiplicity of contact positions circumferentially of the connected ducting sections. Placement of the cables adjacent the camming surfaces has the advantageous effect of forcing the camming surfaces at the points of contact against the flanges in a direction to oppose distortion of the inner walls, and by utilizing a relatively large number of segments, the camming forces are uniformly applied at circumferentially spaced points around the flanges with the result that a very effective and efficient seal connection results.

Referring to FIG. 5, there is shown a slightly modified structure wherein, it will be observed that the end wall instead of being curved or arcuate as indicated at 36 is of planar formation as indicated at 36' and extends at a right angle to the side wall 32 and a parallel extension 33' of side wall 33. The operation of the modified structure is basically the same as that previously described.

From the foregoing description and drawings it will be clearly evident that the delineated objects and features of the invention will be accomplished.

I claim:
1. A clamp for connecting the abutting ends of cylindrical members, said ends having confronting end flanges, comprising:
   (a) a pair of elongate flexible encircling cables having adjacently disposable ends;
   (b) a plurality of segments carried by said flexible cables, said segments having face portions at their opposite ends adapted to engage said confronting end flanges and transversely extending end openings for respectively receiving the cables therethrough, each of said end openings being defined by an inner wall upon which said face portion is formed as an outer camming surface engageable with one of said end flanges, and an outer wall in bridging relation to the inner wall for opposing deflections of the latter due to the action of camming forces thereon; and
   (c) means connected with said adjacently disposed ends having parts operable to apply tension forces to said flexible means and force the face portions of said segments into clamping pressure engagement with said flanges.

2. A clamp according to claim 1, wherein the outer wall is curved.

3. A clamp according to claim 1, wherein the outer wall has sections extending in right angular relation.

References Cited

UNITED STATES PATENTS

| 2,756,079 | 7/1956  | Herman      | 285—408     |
| 3,029,095 | 4/1962  | King et al. | 285—411     |
| 3,107,931 | 10/1963 | Killian     | 285—253 XR  |
| 3,144,264 | 8/1964  | Lewis et al.| 285—367     |

FOREIGN PATENTS

| 721,246   | 5/1942 | Germany.      |
| 1,019,873 | 2/1966 | Great Britain.|
| 150,418   | 6/1955 | Sweden.       |

DONALD A. GRIFFIN, *Primary Examiner.*

U.S. Cl. X.R.

285—367